Aug. 31, 1948.　　　　J. C. QUADY ET AL　　　　2,448,392
CONVERTIBLE TYPE AIRCRAFT
Filed April 4, 1946　　　　　　　　　　　　　9 Sheets-Sheet 1
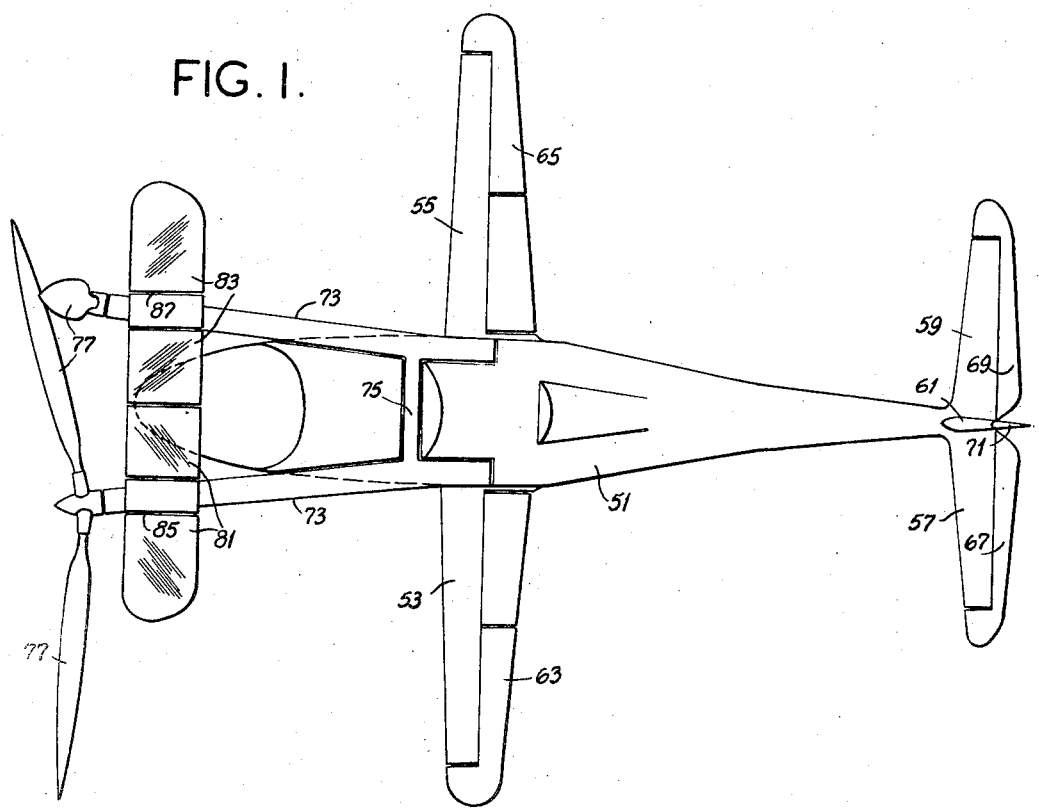
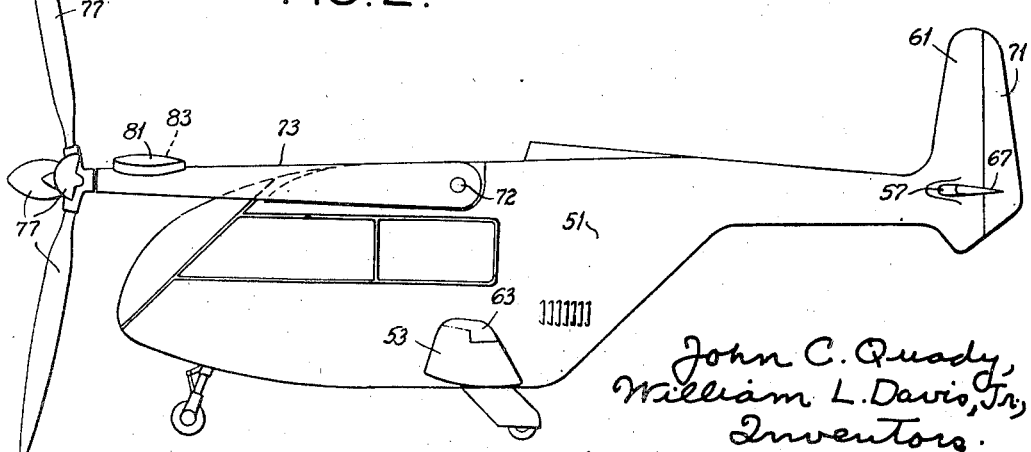

Aug. 31, 1948.  J. C. QUADY ET AL  2,448,392
CONVERTIBLE TYPE AIRCRAFT
Filed April 4, 1946  9 Sheets-Sheet 2

John C. Quady,
William L. Davis, Jr.,
Inventors.
Haynes and Koenig,
Attorneys.

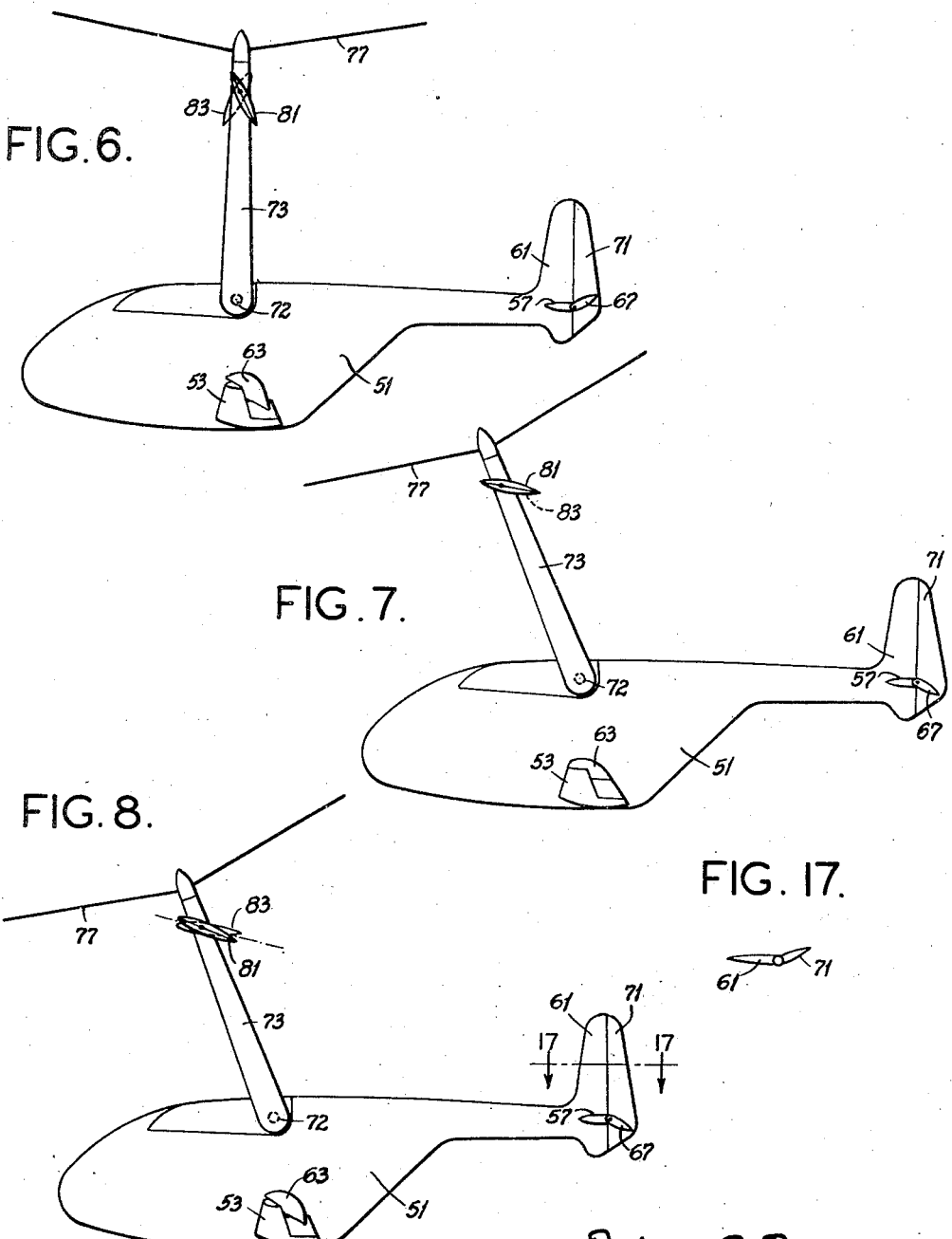

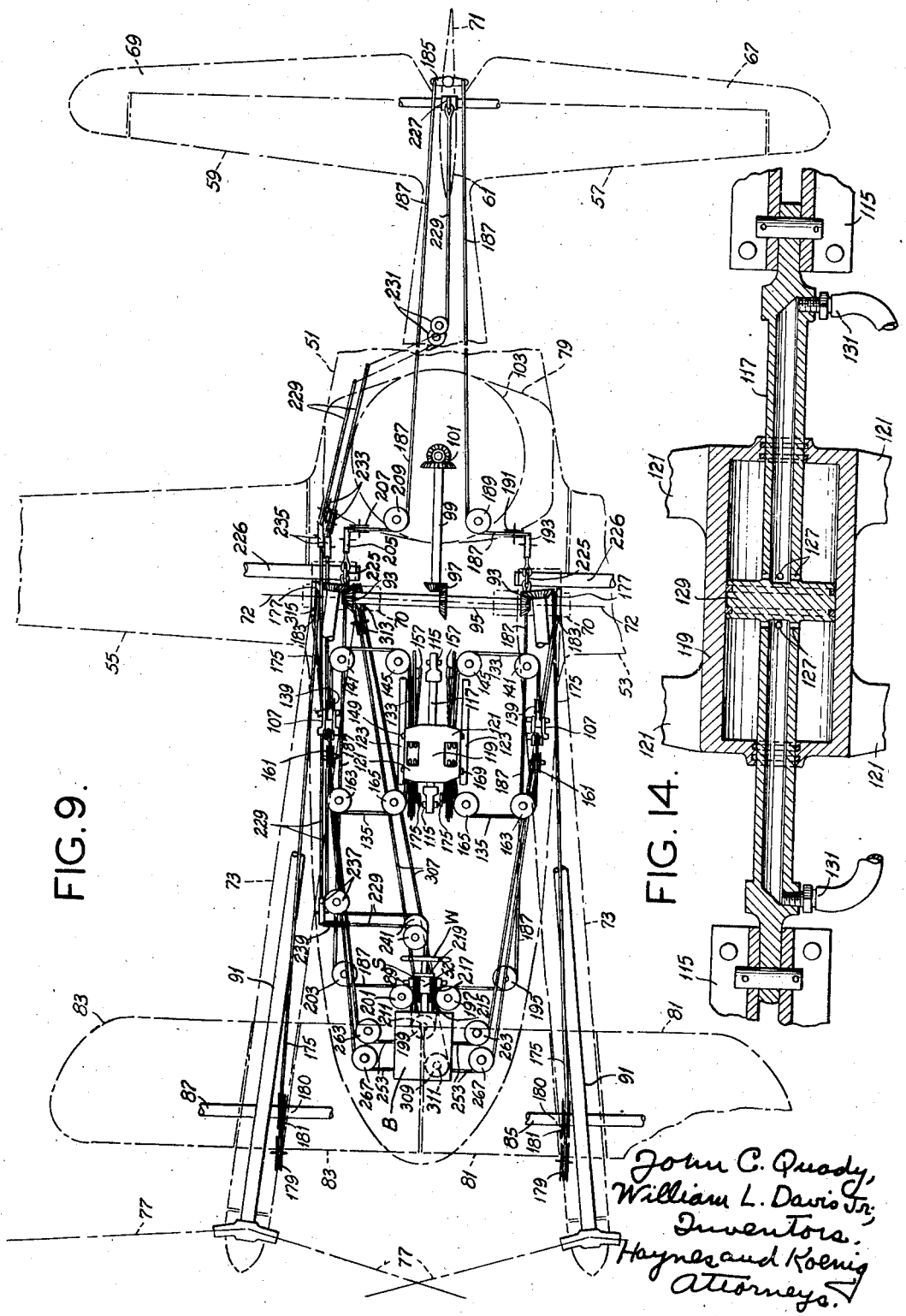

Aug. 31, 1948.    J. C. QUADY ET AL    2,448,392
CONVERTIBLE TYPE AIRCRAFT
Filed April 4, 1946    9 Sheets-Sheet 5
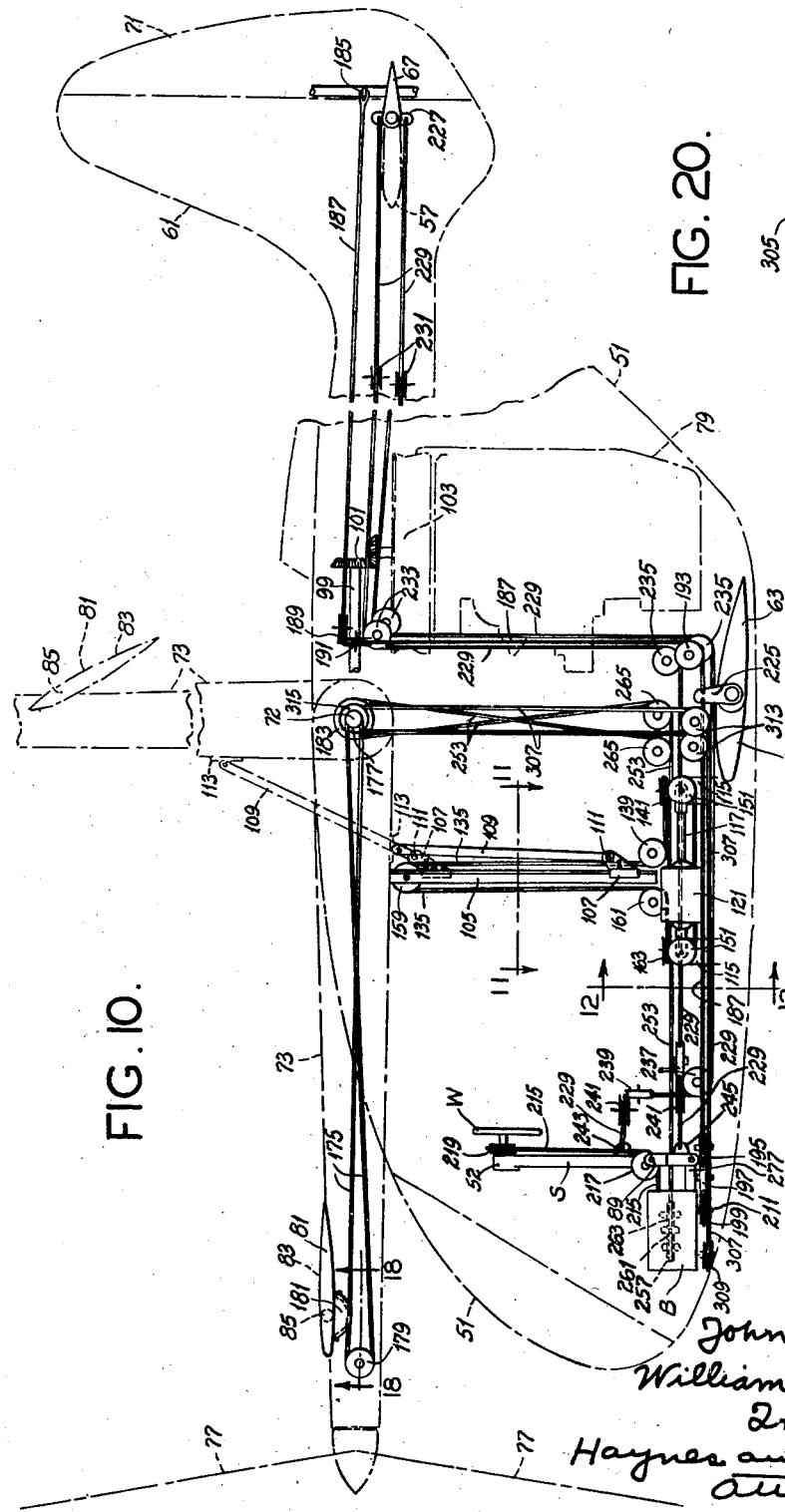
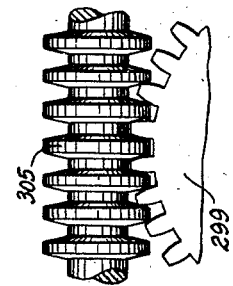
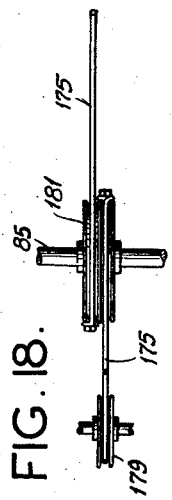

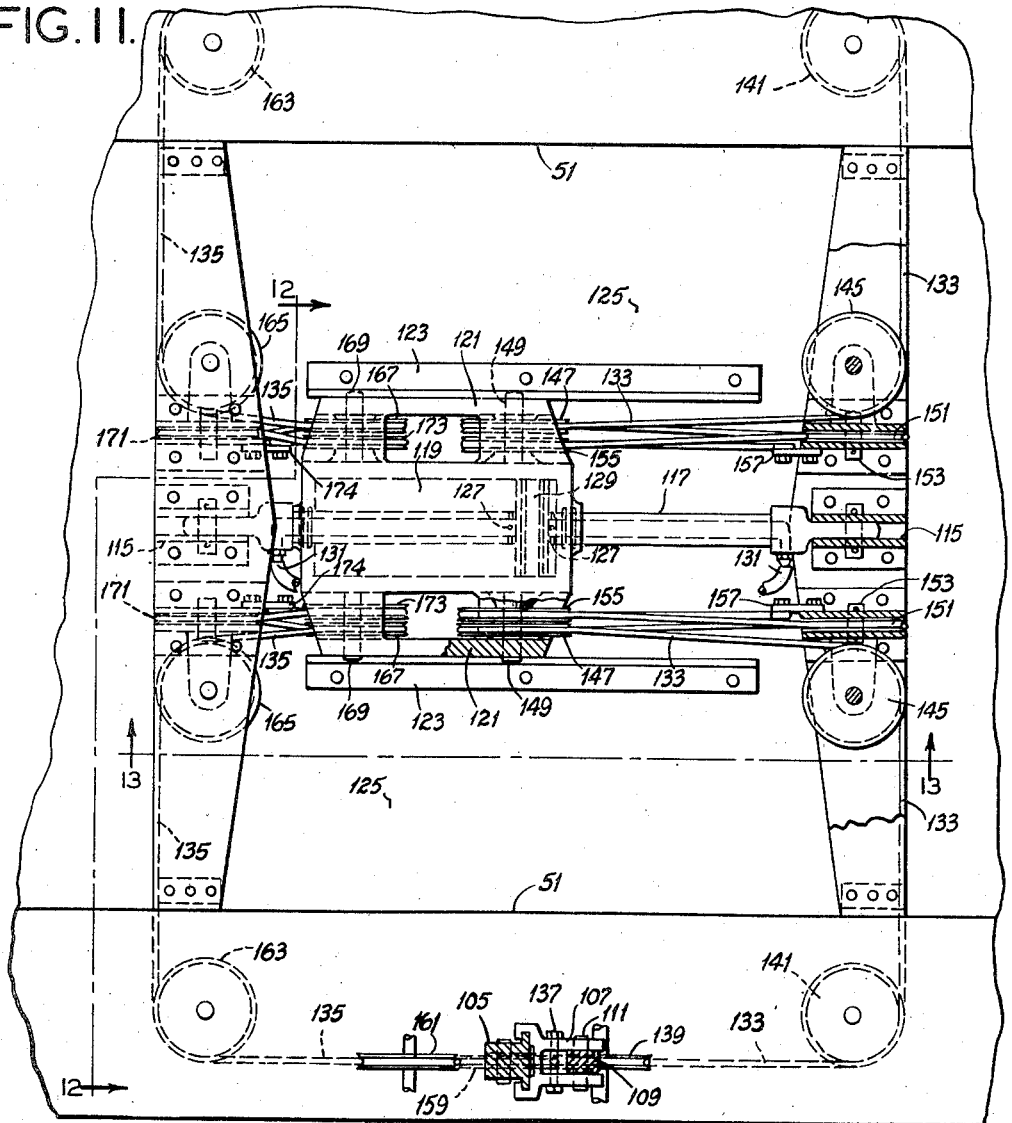
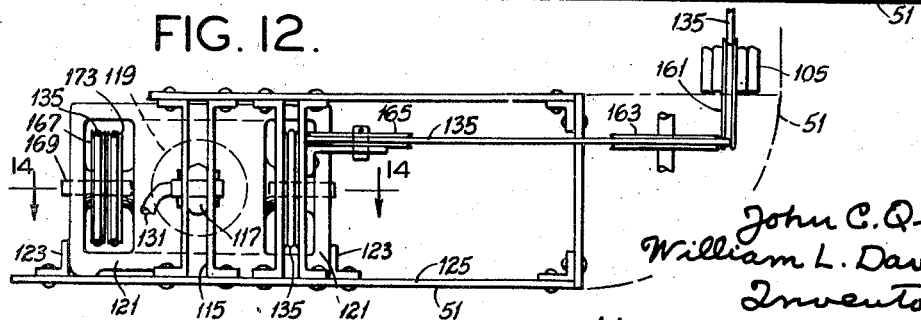

Aug. 31, 1948.  J. C. QUADY ET AL  2,448,392
CONVERTIBLE TYPE AIRCRAFT
Filed April 4, 1946  9 Sheets-Sheet 7

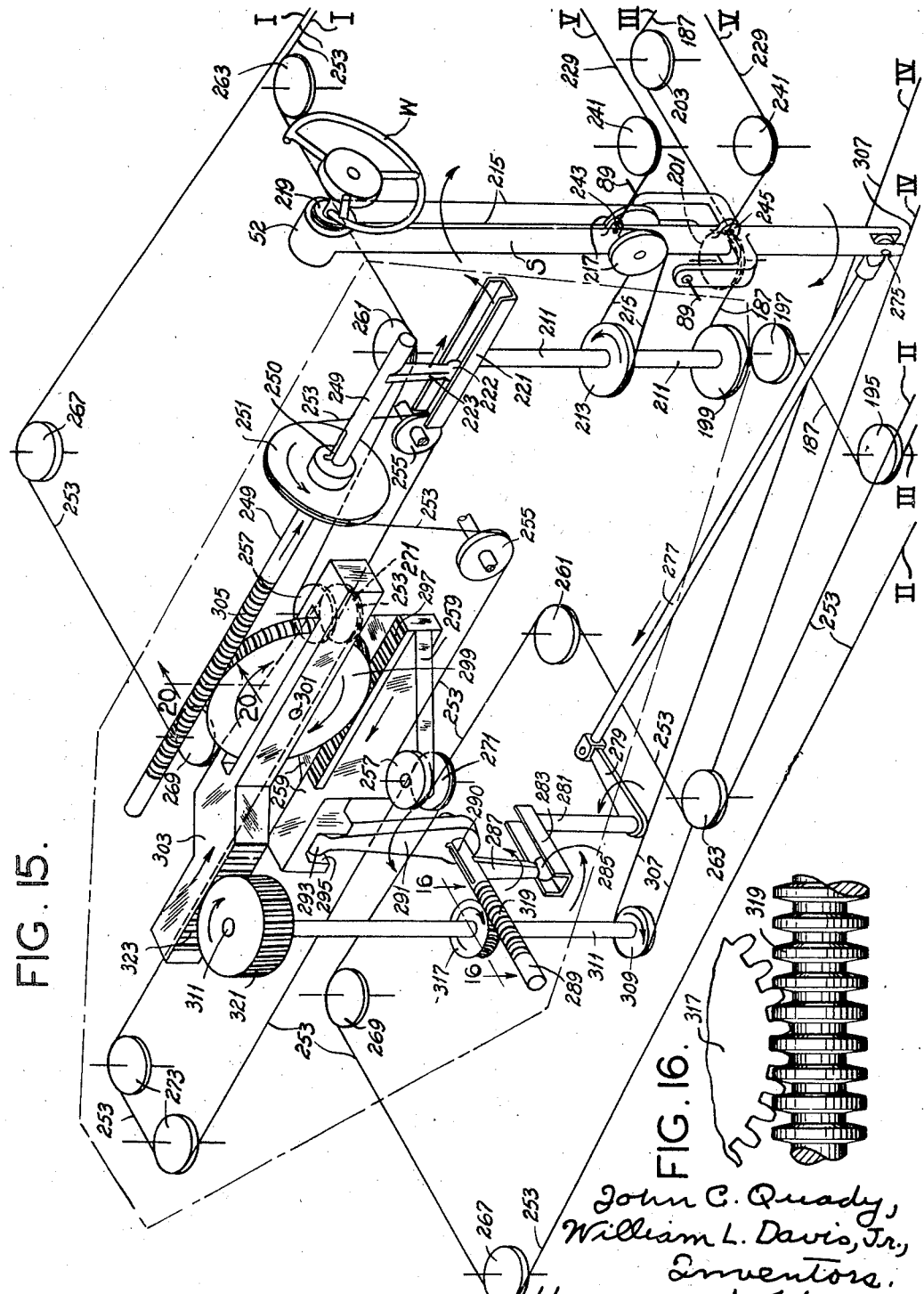

Aug. 31, 1948.　　　J. C. QUADY ET AL　　　2,448,392
CONVERTIBLE TYPE AIRCRAFT

Filed April 4, 1946　　　9 Sheets-Sheet 9

Patented Aug. 31, 1948

2,448,392

UNITED STATES PATENT OFFICE 2,448,392

CONVERTIBLE TYPE AIRCRAFT

John C. Quady, Pasadena Hills, and William L. Davis, Jr., Normandy, Mo.

Application April 4, 1946, Serial No. 659,620

12 Claims. (Cl. 244—7)

1

This invention relates to an aircraft, and with regard to certain more specific features, to an aircraft combining the desirable characteristics both of a helicopter and an airplane.

Among the several objects of the invention may be noted the provision of an aircraft which combines in its functions the close maneuverability and low landing and take-off speeds of a helicopter and the high-speed performance of an airplane; the provision of an aircraft of the class described having an operator-control system which is simple to operate, being operated essentially the same for a given maneuver under conditions either of helicopter or airplane operation or a combination of both; and the provision of an airplane of the class described which is practicable to build, reliable in structure and safe in operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a general top plan;

Fig. 2 is a side elevation of Fig. 1;

Figs. 4-8 are diagrammatic side elevations illustrating different maneuvers, landing gear being omitted;

Fig. 9 is a diagrammatic plan view showing operating controls;

Fig. 10 is a diagrammatic side elevation of said controls of Fig. 9;

Fig. 11 is an enlarged horizontal section taken on line 11—11 of Fig. 10, showing the details of a pylon control mechanism;

Fig. 12 is a vertical section taken on line 12—12 of Figs. 10 and 11;

Fig. 14 is a horizontal section taken on line 14—14 of Figs. 12 and 13;

Fig. 15 is a diagrammatic perspective view of certain control elements, being extended in Fig. 19;

Fig. 16 is an enlarged detail section taken on line 16—16 of Fig. 15;

Fig. 17 is a horizontal detail section taken on line 17—17 of Fig. 8;

2

Figure 19:
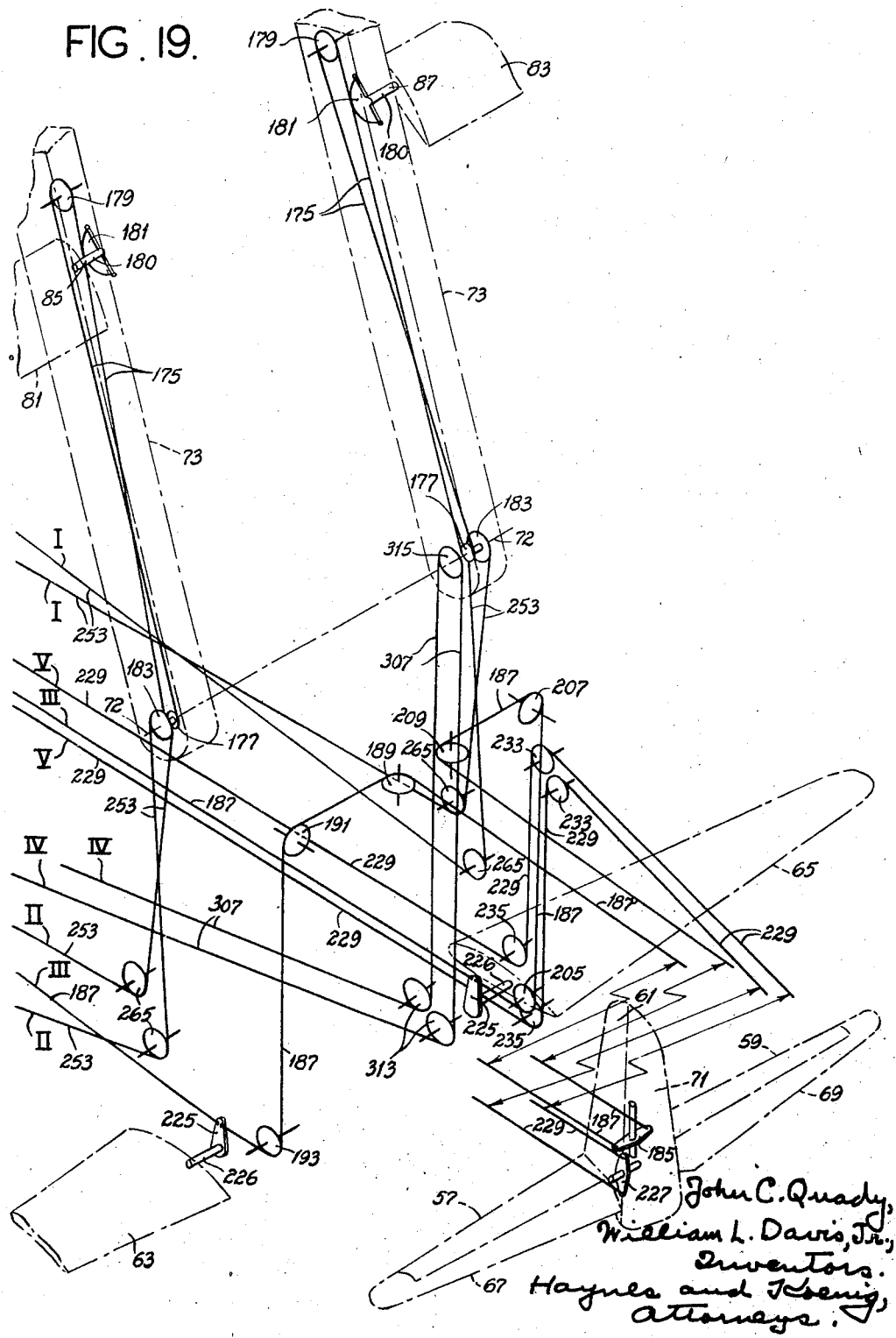

Fig. 18 is a horizontal detail section taken on line 18—18 of Fig. 10;

Fig. 19 is a perspective view of certain control elements, being extended in Fig. 15; and, Fig. 20 is a vertical section taken on line 20—20 of Fig. 15.

Similar reference characters indicate corresponding parts throughout the several views of the drawings.

As between Figs. 15 and 19, the Roman numerals indicate how these figures may be read connectedly.

As is known, present-day helicopters have advantages of extreme maneuverability and low landing and take-off speeds, making them very useful in cramped quarters. But helicopters are essentially low-speed aircraft. On the other hand, the conventional airplane is a relatively high-speed aircraft but suffers the disadvantage of requiring high landing and take-off speeds. Also, it is not as maneuverable as the helicopter. The present invention provides a simple, safe, easily controlled aircraft combining the advantages of both the helicopter and the airplane.

Figure 3:
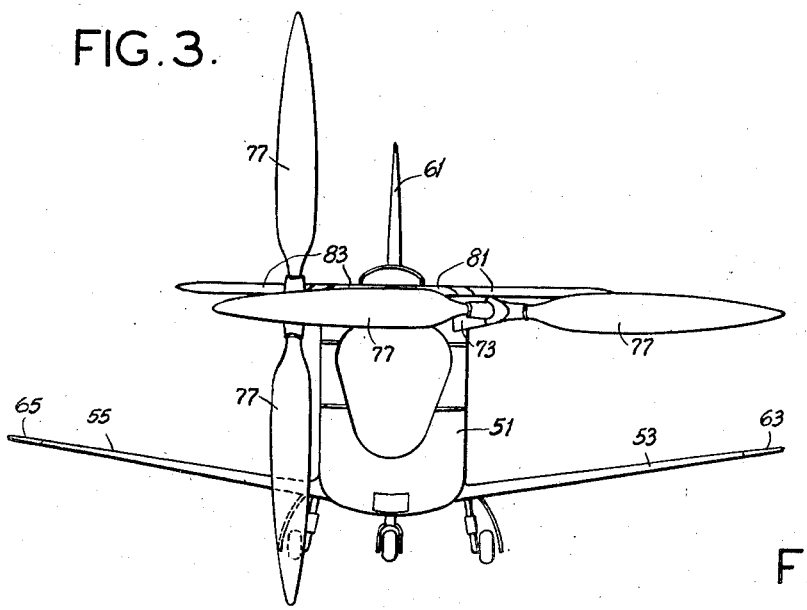
Fig. 3 is a front elevation of Fig. 1.

Referring now more particularly to the drawings, Figs. 1-3 show the general appearance of the new aircraft. It comprises an air frame 51, carrying wings 53 and 55, fixed stabilizers 57 and 59, and a fin 61. Control surfaces include ailerons 63 and 65 on the wings 53 and 55, respectively; elevators 67 and 69 attached to the stabilizers 57 and 59, respectively; and a rudder surface 71 attached to the fin 61.

Figure 4:
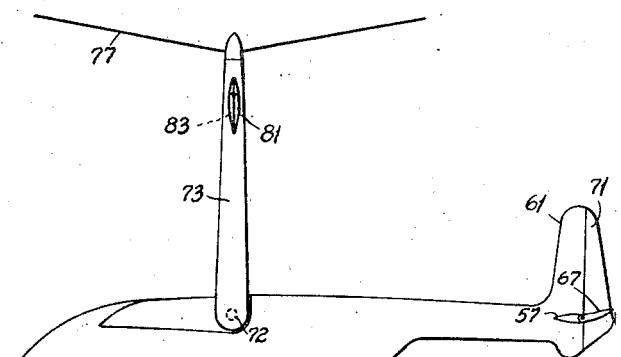

Pivoted to the air frame 51 at 72 are a pair of pylons 73 rigidly connected at 75. These pylons may be moved from a horizontal position such as shown in Figs. 1-3, through essentially a 90° angle to a vertical position such as shown in Figs. 4 and 6, for example. They may also assume intermediate positions. Each pylon 73 carries an air screw 77. The air screws 77 are phased to prevent interference. Both screws are driven from a vertically disposed internal combustion engine 79 (Figs. 9 and 10) through a drive (to be described) which is effective, regardless of the angular positions of the pylons 73. Thus power may be delivered uninterruptedly from the engine 79 to the phased screws 77, regardless of the angular positions of the pylons 73. The screws may be referred to as propellers when the pylons are down in the Fig. 2 position (for example) and as rotors in the Fig. 4 position (for example). They are designed for both functions.

The pylons 73 respectively carry independently moving control surfaces 81 and 83 pivoted at 85 and 87, respectively. Each surface 81 and 83 is in two parts, one on each side of its respective pylon, but both parts are effective as one surface. As will be shown, the surfaces 81 and 83 may be moved together or differentially.

Complete control of the aircraft in all aspects of its operation, including both helicopter and airplane operation, is supplied from a control wheel W (Figs. 9, 10 and 15) and a fore-and-aft swinging control stick S. The stick S swings forward and backward on a horizontal pivot 89 (Fig. 15). The wheel turns with respect to the stick S in a bearing 52. Either under helicopter or airplane aspect of operation, steering is accomplished to the right by rotating wheel W to the right, and to the left by rotating the wheel to the left. Pitching is accomplished by moving the wheel W backward or forward, pivoting of the stick S occurring then at 89. Both of these controlling operations (steering and pitching) may be performed simultaneously. Before describing the controls, the main drive will be described.

Both pylons are pivoted, as stated, at 72, about an axis which is essentially over the center of gravity of the craft. Each pylon is hollow and carries a longitudinal drive shaft, as indicated at 91. At the outer ends of the drive shaft 91 are said rotor propellers 77, respectively. At the inner ends of the shaft 91, near the pivot 72, are equal bevel gear drives 93 from a countershaft 95. A bevel gear drive 97 connects with a second countershaft 99 and a third bevel gear drive 101 connects the countershaft 99 with the engine 79. Suitable declutching means is associated with the engine 79, indicated generally at 103 but not detailed since such is conventional. It will also be understood that the gudgeons 70 forming the pivots 72 of the pylons 73 are carried upon suitable bearings in the frame of the ship and that their center lines are coaxial with the countershaft 95. The bevel gear sets 93 are within the pylons. Thus when the pylons swing about the center lines of the gudgeons 70, motion may be delivered uninterruptedly from the engine 79 to the rotors 77, regardless of the angular positions of the pylons. This is due to the planetary action which may occur in the bevel gears 93 during the time that adjustments are made, in addition to the power driving action through the gear trains. It is to be understood that the rotor propellers 77 are designed not only to propel the ship as an airplane but to lift it as a helicopter. They may therefore be referred to as rotors or propellers, depending upon whether they are functioning in helicopter or airplane aspect. They may be of the variable pitch variety adapted to be adjusted either together or differentially, but since propeller and rotor pitch adjustment means of this nature are known, these will not be detailed. It suffices to state that by rotor pitch control, including differential pitch control for controlling in roll while hovering, it is possible to control the craft for hovering in a side wind or under an eccentric loading condition with respect to the plane of symmetry, or for causing sideward motion of the craft. This is accomplished by a change in the relative thrust between the rotors as a result of changing their relative pitch, thus providing a rolling moment to accomplish the desired motion. The relative pitch of the rotors may be changed by a separate rotor pitch control, not shown herein, but which may be of the type shown in U. S. Patent 2,330,842. By propeller pitch control (operating as an airplane) the usual advantages may be attained in this respect. It is to be understood, however, that the controls hereinafter to be described are independent of any such variable rotor pitch adjustments.

The pylons are constrained to move together and can be moved from the horizontal (Fig. 2) to an essentially vertical position (Fig. 4), or any intermediate position (Fig. 7) by the control means shown in Figs. 9–14. This control means consists in a pair of vertical guides 105 carrying vertically movable sliders 107. Connecting rods 109 are pivoted at 111 to the sliders and at 113 to the respective pylons 73. The guides 105 are suitably fastened to the frame of the ship.

Also attached to the frame of the ship are two brackets 115 which rigidly anchor opposite ends of a stationary hollow piston rod 117 on which is a stationary piston 129. Carried around the piston rod 117 and piston 129 is a hollow cylinder 119. This cylinder has brackets 121 which slide between angles 123 and upon a plate 125 (Fig. 12) attached to the frame 51. The hollow piston rod 117 is connected with the inside of the cylinder 119 on opposite sides of the piston 129 by means of ports 127. Hydraulic fluid can be fed to either set of ports 127 through one of the pair of inlets 131 associated with the hollow piston rod on the outside of the cylinder 119. The connections 131 are alternatively inlets or outlets.

The connections 131 are under control of suitable conventional valve means such that when fluid under pressure is admitted to one port 131, the other port 131 is connected to exhaust and vice versa, thus making it possible to move the cylinder 119 back and forth with respect to the fixed hollow piston rod 117 and the guides. The purpose of this movement is simultaneously to control the two sliders 107, one of which is on each side of the ship under a pylon 73. This control is effected on each side by a pair of cables 133 and 135. Description of one side (the lower side) of Fig. 11 will be sufficient to disclose the operation of both sides. Both cables 133 and 135 (on a side) are anchored to the slide 107, as shown at 137. Cable 133 passes downward and under a pulley 139, then around a corner pulley 141 which is carried on a fixed pivot in the frame. The cable then passes over a second corner pulley 145 also on a pivot fixed in the frame. The cable then passes around a pulley 147, carried upon a pin 149 located on one of said brackets 121. It will be recalled that brackets 121 are carried with the cylinder 119. The cable then passes under a pulley 151 which is carried on a pivot pin 153 fixed in the frame. The cable then passes over a second pulley 155 coaxial with the pulley 147 on the pin 149 and finally to an anchor 157 on the frame.

The cable 135 extends from the upper side of the slider 107 and passes over an upper pulley 159 and then down under a pulley 161 on the frame; thence around two horizontal pulleys 163 and 165 on the frame. The cable 135 then passes over a pulley 167 carried on a pin 169 associated with one of the brackets 121 of the cylinder 119. It then passes around a pulley 171 pivoted in the frame and then over a second pulley 173 also carried on the pin 169. The cable then passes to an anchor 174 attached to the frame. In the upper portion of Fig. 11, like reference characters indicate like parts to those just described.

Thus when the cylinder is moved back from the position shown in Figs. 10 and 11 to an intermediate position shown in Fig. 14, the pylons are lifted to an intermediate position. When the cylinder reaches the rear end of its stroke, the pylons are lifted into a vertical position. The purpose of the sets of pulleys 147, 151, 155 and 167, 171 and 173 is to provide a block and tackle arrangement which multiplies the motion of the cylinder as transmitted to the sliders 107. In the present example, the ratio of movements is 4:1, but it will be understood that any other suitable ratio may be used. The purpose of the multiplying ratio is to obtain a relatively short stroke for the action of the cylinder 119.

The supplementary control surfaces 81 and 83, respectively pivoted to the pylons 73, are controllable either together or differentially. Each surface (Figs. 9, 10, and 19) is under control of a crossed cable 175, which provides a flexible connector between a small pulley 177 and a larger sector 181 and an idler pulley 179. These pulleys have bearings in the respective pylons. The opposite ends of each cable 175 are connected to opposite ends of sectors 181 attached to the pintles 180 of the respective supplementary surfaces 81 and 83. Each pulley 179 and 177 and sector 181 is rotary with respect to its respective pylon. Each pulley 177 also forms a rigid cluster with a pulley 183. As will be shown, the pulleys 183 are under control of other cables to be described. However, whenever the pylons 73 are angled from one position to another, relatively to the pulleys 177 and 183, there will be a planetary action of sectors 181, through the cables 175, with respect to the pulleys 177. Sectors 181 are larger in diameter than the pulleys 177. Hence if the attitudes of the supplementary surfaces 81 and 83 are horizontal when the pylons are horizontal (Fig. 10), then when the pylons are simply raised 90°, without other adjustments, the attitudes of the surfaces 81 and 83 will be at about 30° with respect to the axes of the pylons 73. In other words, the supplementary surfaces 81 and 83 will also rotate in the same directions as the pylons but through a smaller angle, by virtue of the stated difference in pulley diameters. If the pulleys 177 and sectors 181 were the same size, the supplementary surfaces would remain horizontal as the pylons move. The diameters of sectors 181 are such that the neutral positions of the supplementary surfaces 81 and 83, when the pylons are vertical, makes the stated angle of about 30° which is shown in dotted-line position at the top of Fig. 10.

The remaining control surfaces (i. e. ailerons 63, 65; elevators 67, 69; and rudders 71) perform the following functions when the machine operates as an airplane: The ailerons roll the craft for banking in a turn, the elevators cause a pitching moment to raise or depress the nose, and the rudder causes a yawing moment to turn the craft. The supplementary surfaces 81 and 83 perform additional functions. First, they enable the craft to be maneuvered as a helicopter and to provide stability and control over the craft while in transition from helicopter flight to airplane flight. While the craft is operating as an airplane they provide some trim, that is, they provide some lift to balance the pylon forward overload.

Referring to said Figs. 9, 10, 15 and 19, rudder action is obtained by angling a rudder bar 185 attached to the rudder 71. To opposite ends of the rudder bar 185 are attached opposite ends of a cable 187 which passes forward over the following pulleys 189, 191, 193, 195, 197, 199, 201, 203, 205, 207, 209 and back to the opposite side of the rudder bar 185. The pulley 199 is fastened on the lower end of a control shaft 211, which carries a pulley 213. This pulley 213 is under control of a cable 215 which passes over opposite pulleys 217 on the post S and around a pulley 219, connected with the wheel W. Thus by turning the wheel W right or left, the rudder 71 is turned to yaw the ship for a right or left turn, respectively. This will be effective in any fore-and-aft position of the wheel W. The upper end of the control shaft 211 carries a grooved slide bar 221, in the groove of which is operative the lower ball end 222 of a control lever 223. Turning of the wheel W also turns bar 221, for purposes which will appear.

As is known, an airplane can seldom be placed in a well coordinated turn simply by yawing. It must ordinarily also be banked for a turn and this is accomplished by connecting oppositely moving portions of cable 187 to opposite horns 225, connected respectively to the opposite ailerons 63 and 65. When one side of the cable 187 moves forward, the other side moves back and the coordination is such that for a right turn, the left-hand aileron is depressed and the right-hand one is lifted for obtaining the proper bank. Conditions are the reverse for a left turn.

The elevators 67 and 69 operate together under control of an elevator bar 227, to opposite ends of which are connected cables 229. These cables pass forward over the following pulleys: pair 231, pair 233; pair 235, pair 237, single 239 and pair 241. Pulleys 231, 237 and 239 are shown in Figs. 9 and 10 but not in Figs. 15 or 19. The other ends of the cables are connected to the post S at 243 and 245, the former connection being above the pivot 89 and the latter below. Hence when the post S is rocked forward or backward by pushing and pulling wheel W, the elevators are controlled. A forward push on the post from the steering wheel W will depress the elevators so as to depress the nose of the ship and vice versa.

From the above it will be seen that by rocking the post S and turning the wheel W, all of the conventional controls are obtained for the ailerons, elevators and rudder, for use when the pylons 73 are horizontal and the ship being flown as an airplane.

The steering wheel W is also capable of effecting control of the supplementary surfaces 81 and 83 so that they will aid in steering the aircraft, both when used as an airplane and as a helicopter. Thus, turning of the wheel W, through action of cable 215 on pulley 213, causes rotation of shaft 211 and of grooved bar 221. This action moves the ball end 222 of lever 223, provided the ball is not coaxial with the shaft 211. Lever 223 is carried on a horizontal control shaft 249, to which a pulley 251 is splined for relative axial movement only. Over the pulley 251 is wrapped a cable 253, which passes over the following: Pulleys 255 which are on fixed pivots in the air frame; pulleys 257 which are on movable pivots carried on opposite sides of a sliding bar 259; fixed pulleys 261, 263, 265, said pulleys 183 which are rotary in the pylons 73; then over fixed pulleys 267, 269; then pulleys 271 (on the same axes as 257 respectively); and over pulleys 273 to complete a circuit.

Pulleys 183 have already been mentioned as those which control the rotations of pulleys 177. Since the latter have the crossed cable connections with the pulleys 179 and the sectors 181, said cable 253 controls the differential angular positions of the supplementary surfaces 81 and 83. The differential angles through which the supplementary surfaces are turned are opposite with respect to a median position. This is true because as cable pays out on one side of the pulley 251 it is drawn in on the other side. This causes the opposite pulleys 183 to be oppositely rotated for any given rotation of the wheel W. It should be remarked at this point that the degree and sense of differential (opposite) movement between the supplementary surfaces 81 and 83 is a function of the distance of the ball 222 in one direction or another from the center of rotation of the shaft 211. How and why this is varied will be described later.

When the supplementary surfaces 81 and 83 are differentially moved by turning the wheel W, the member 259 which supports pulleys 257 and 271 is not moved thereby, since as much of cable 253 pays around pulleys 257 as around the adjacent pulleys 271.

Equal (non-differential) movements of the supplementary surfaces 81 and 83 are accomplished by moving the post S forward or backward. For this purpose there is arranged at the lower end of the post a pivot connection 275 with a rod 277 reaching to a lever 279. This lever rotates a rod 281 which carries a slotted bar 283. The ball end 285 of a lever 287 is carried in this slotted bar 283. The lever 287 extends from a control shaft 289. The latter is splined at 290 to a lever 291. The spline 290 allows only relative axial movement between shaft 289 and lever 291. A ball end 293 of lever 291 cooperates with a recess 295 in the movable member 259. Hence when the control stick S is rocked backward, the movable member 259 is moved forward. This equally moves forward the pairs of pulleys 257 and 271. Pulleys 257 draw in equal amounts of opposite portions of the cable 253 and pulleys 271 pay out equal amounts. This rotates both pulleys 183 clockwise equally (Fig. 19) which, through cables 175, causes the surfaces 81 and 83 to have their leading edges raised equally. When the stick S is rocked forward the action is reversed.

On the upper surface of the member 259 is a toothed rack 297, which meshes with a gear 299 mounted for rotation at 301 in a control bar 303. Assuming a given position of the bar 303, any forward or rearward motion of the rack 297 will cause rotation of the gear 299. The upper perimeter of the gear 299 meshes with a circular rack 305 cut into the shaft 249 (see also Fig. 20). When the stick S is pulled backward at wheel W the movements may be traced by the arrows in Fig. 15, on the train of parts S, 277, 279, 283, 287, 291, 259, 299, 249, 223 and 222. Thus ball end 222 is adjusted in the grooved bar 221 and the degree of differential action established for the supplementary surfaces 81 and 83 by turning the wheel W is a function of this adjustment. When the ball 222 is about on the center of the shaft 211, the supplementary surfaces are in approximately a 30° position with respect to the pylon axes when the pylons are vertical.

Provision must also be made for correcting the attitudes of the supplementary surfaces during the transition period in bringing the pylons from vertical to horizontal or vice versa. This is accomplished by means of a cable 307 which is threaded over a pulley 309 of the lower end of a vertical control shaft 311 and also over pulley 313 and a pulley 315 attached to the right-hand pylon 73. Thus pylon movement causes movement of the cable 307, and rotation of the pulley 309 and of the vertical control shaft 311. This control shaft has attached to it a gear 317 which meshes with a circular rack 319 on the control shaft 289 (Fig. 16).

The rack 319 and the rack 305 above described are similar in form, being made by cutting circular tooth forms on a shaft to mesh with a gear so that rotation of the rack will not turn the gear.

The upper end of the control shaft 311 carries a gear 321 which meshes with an ordinary rack 323 on the side of the bar 303. The bar 303, it will be remembered, controls the position of the center 301 of the gear 299. Thus when the pylons are angled, as during a transitional adjustment of the same, the rack member 303 moves backward or forward. Assuming member 259 to be a body of reference, the gear 299 will then roll on the rack 297 and through its mesh with the circular rack 305 control the axial position of the bar 249 and hence the position of the ball 222 in the grooved lever 221. Thus, the angular positions assumed by the pylons exert a corrective action upon the amount of adjustment that can be delivered from the wheel W to the supplementary surfaces 81 and 83, depending upon the pylon attitude. When the pylons raise, the shaft 249 moves backward (to the right in Fig. 15).

Figure 5:
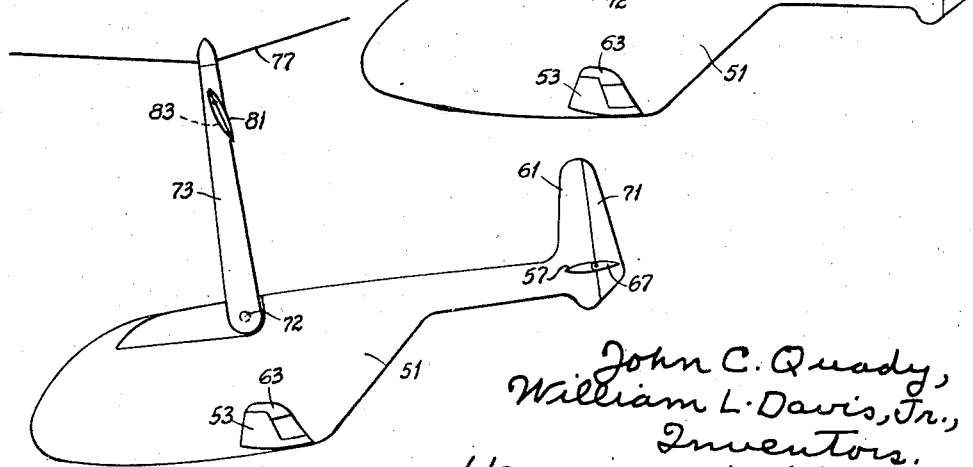
Figure 13:
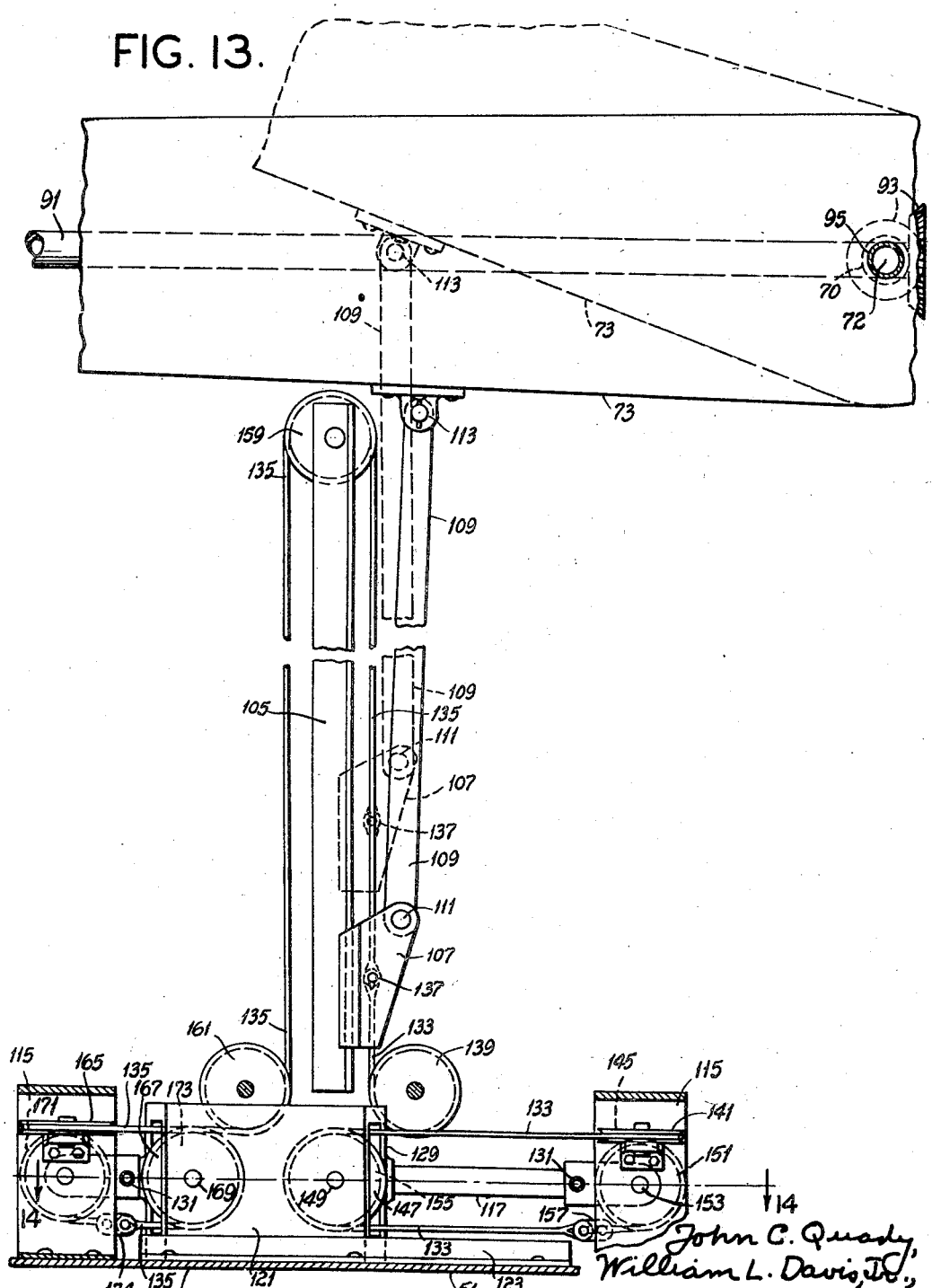
Fig. 13 is a vertical section taken on line 13—13 of Fig. 11.

Operation is as follows:

Assuming first helicopter flight, fluid is admitted to the right-hand end of the cylinder 119 to move it backward and thus raise the pylons 73 to a vertical position such as shown in Figs. 4, 5 and 6. Operation of the rotors 77 from the engine 79 will now cause them to operate as vertical air screws to lift the craft vertically.

Two things occur in connection with the upward movement of the pylons. First, this movement changes the ratio of the motion of the supplementary surfaces 81 and 83 to that of the control wheel W. Second, for a given rotation of the control wheel W, this affects the sense in which the supplementary surfaces deflect differentially from their mean positions. The reason for this will appear.

As the pylons rise, the gears 321 and 317 rotate in the direction shown by the arrows in Fig. 15. This is due to the action of the cable 307 as it is driven by the pulley 315, the latter rotating with the rotating pylons. This moves the ball end of the lever 287 in the channel of the lever 283, movement being away from the center of the shaft 281. Spline 290 allows relative axial movement between shaft 289 and the lever 291. Rack 303 also is moved backward in the direction shown by the arrow thereon. Gear 299 then rolls on the rack 297 in the direction shown by the arrows. This pushes the circular rack 305 backward, as shown by the solid arrow thereon. This does not affect the position of the pulley 251, because of the splined connection 250. The ball end 222 of arm 223 is at this time pushed to the center of the channel in the lever 221, that is, on the center line of the shaft 211. This produces a neutral position of parts for helicopter flight, provided wheel W and stick S are in neutral positions. The surfaces 81 and 83 are then as shown in dotted lines in Fig. 10, that is, at about 30° to the pylon axis.

Next, assume that due to the operation of the rotors 77 the craft rises in still air. The wheel W is at this time pulled back for hovering as a helicopter. This tilts back the stick S and moves the rod 277 forward, rotating shaft 281 anti-clockwise (looking down). The ball end 285 of the lever 287 moves anti-clockwise. This rotates lever 291 anti-clockwise. This moves the member 259 forward, which carries with it the pairs of pulleys 257 and 271. This action through the cable 253 causes both pulleys 183 to rotate clockwise the same amount, it being understood that the pylons are at this time in a vertical position. This rotates the supplementary surfaces 81 and 83 the same amount and in the same direction, due to the action of the cables 175. The result will be as shown in Fig. 4 wherein the surfaces 81 and 83 are moved to essentially a vertical position so that the slipstream of the rotors 77 passing over surfaces 81, 83 will induce no pitching moment. Next assume the craft hovering in a slight head wind. The wheel W is at this time pushed forward from its position for still air thus reversing the directions of all components described above so that the leading edges of surfaces 81, 83 will be moved forward. The result will be as shown in Fig. 5 wherein the forward tilt of the surfaces 81 and 83 act in the slipstream of the rotors 77 to tilt the craft forward to provide a forward negative pitching moment (nose down) with a force component from the rotor air stream to balance the wind force. This tilt under these Fig. 5 conditions is less than would have occurred if the wheel W were in its neutral position as in Fig. 10. This is because when the wheel W is in neutral position the control surfaces 81 and 83 are at the stated 30° angle to the pylons. In Fig. 5 they are adjusted to less than 30°. At any time that it is desired to permit the craft to move forward under the Fig. 5 conditions, the wheel is pushed forward closer to the neutral, so that the angle of the surfaces 81 and 83 is greater with respect to the pylon axis, thus giving a greater forward tilt and a greater forward component of thrust overbalancing the wind thrust. This will move the craft forward as a helicopter.

As stated, if at the time of the initial rise of the craft there is no head wind, the wheel W may be pulled back to attain the conditions of Fig. 4, for hovering. This Fig. 4 setting is even effective for hovering in a slight tail wind if the center of gravity with the pylons up be assumed to have moved back some behind the centers 72. For some backward movement of the craft the wheel may be pulled even more to pull back the leading edges of the surfaces 81 and 83 to attain from the slip stream some backward tilting action on the surfaces 81 and 83. This causes a positive pitching moment (i. e. nose up) which tilts the entire craft backward.

It will be observed that pulling back of the wheel W not only causes the pairs of pulleys 257 and 271 to move forward but, through action of the rack 297, causes the gear 299 to force backward the rack 305. This had the effect of moving the ball end 222 of said lever 223 more rearward in channel 221. The result is increased differential angular movement of the supplementary surfaces 81 and 83 for a given rotation of the wheel W as wheel W is pulled back while the craft is in helicopter attitude. It should be noted here that for helicopter operation (pylons essentially vertical), the stick S (Fig. 15) must be held well back from neutral position to a greater or lesser degree, depending upon whether rearward hovering or forward flight is desired. While in this rearward position, the ball end 222 of lever 223 is always rearward of the center line of rotation of shaft 211 and hence always produces differential angling of surfaces 81 and 83 in the same sense for a given direction of rotation of the wheel W.

Assume next that the wheel W is turned to the right while hovering as in Fig. 4 (for example). Pulley 213 is rotated anti-clockwise looking down, or as shown by the arrow thereon. The rear end of the channel lever 221 moves in the direction shown by the arrow at that point. This causes the ball end 222 of the arm 223 to move likewise, which rotates pulley 251 anti-clockwise, as shown by the arrow thereon. This, through cable 253, rotates the pulleys 183 in opposite directions. The resulting positions of the supplementary surfaces 81 and 83 are then as shown in Fig. 6, the same being oppositely angled from a mean vertical position. If the wheel had been rotated in the Fig. 5 aspect of the surfaces 81, 83, the latter would have angled oppositely around their mean position shown which also would have resulted in turning. Thus in helicopter aspect, when the supplementary surfaces 81 and 83 are in oppositely angled positions from any mean position (Fig. 6 for example), the down draft of air from the rotor causes a turning moment on the craft to turn it to the right. Obviously, if the wheel W is turned to the left, the supplementary surfaces 81 and 83 will be inversely positioned, thus causing the craft to be turned to the left. The turning in both cases is on or near a vertical axis.

Next, assume the craft is to be headed with motion into the wind without turning (not hovering). The rotor axes must be tilted forward to supply an unbalanced forward component of thrust. This is not accomplished by lowering the pylons, but the supplementary surfaces 81 and 83 are rotated together with respect to the pylons to an angle greater with respect to the pylons than shown in Fig. 5, so that the rotor blast striking them causes a substantial negative pitching moment (i. e. to depress the nose) which tilts the whole craft into the wind. This is done by pushing further forward the wheel W. Thus increased forward speed is obtained by pushing the wheel W further forward, which tends to turn both supplementary surfaces 81 and 83 anti-clockwise (referring to Fig. 5) so as to increase the forward negative pitch.

If it be assumed that the craft is hovering or operating in a side wind, it will be understood that control may be accomplished by a combination of the turn on the wheel W (right or left) and a forward or rearward push or pull thereon. This produces a combination of the above effects. Thus when the wheel W is pushed forward, the mean positions of the supplementary surfaces 81 and 83 are moved so as to bring their upper edges more forward; and any turning of the wheel will produce opposite differential angling of the surfaces 81 and 83 about the new mean position. Thus the pilot can advance forward while turning in either direction, while operating as a helicopter (pylons up, or nearly up).

Summing up the helicopter flight conditions, forward deflection of the leading edges of the supplementary surfaces 81 and 83 favors forward motion of the craft by tilting the craft forward, which depresses the nose. Rearward deflection of the supplementary surfaces favors rearward motion of the craft. Forward deflection of the left supplementary surface and rearward deflection of the right supplementary surface favors a turn to the right. Opposite deflections favor a turn to the left.

By differentially changing the pitches of the rotors 77 (in the manner for each of which this is usually accomplished and requiring no description here) the craft may be tilted to the right or left, thus adding this component of control for causing a sidewise motion by sidewise drag of the rotor due to the tilt.

Although the conventional aileron, stabilizer and rudder surfaces have, during the above helicopter operations, been also subject to control, their operations are not detailed here since they have no effect on the craft while hovering or moving relatively slowly as a helicopter.

Next, the matter of transitional flight will be considered. This occurs when the pylons are let down as illustrated in Fig. 7. When the pylons are still nearly vertical the craft is capable of forward motion as a helicopter up to a velocity great enough to cause the wings to supply a lift equal to the weight of the craft.

In partial or full airplane attitude the supplementary surfaces 81 and 83 must, in assisting the ailerons have their relative motions reversed from the helicopter sense, and in moving together to assist the elevators, move through smaller angles. Thus, as shown in Fig. 8, the amount of possible differential movement of the supplementary surfaces 81 and 83 about a mean position shown in dotted lines is reversed from that shown in Fig. 6. That is to say, the same sense of turning effect on the craft is produced by opposite deflection of the supplementary surfaces in the Fig. 8 transitional attitude This is caused by pulley 315 turning anti-clockwise (Fig. 19) as the pylons are depressed. This moves the cable 307 in a direction such that the pulley 309 is turned anti-clockwise (looking down), which turns the gear 321 anti-clockwise and moves forward the member 303, which rolls the gear 299 on the rack 297, thus causing the ball end of the lever 223 to be positioned forward in the grooved lever 221, i. e., ahead of shaft 211. This reverses the differential movement between the supplementary surfaces, as caused by any movement of the cable 253, obtained by turning the wheel W. Also, the anti-clockwise motion of the gear 317 (looking down) also moves the rack bar shaft 289 so as to cause the ball end of the lever 287 to be closer to the center of the shaft 281. This causes less motion to be transmitted from the lever 291 to the member 259 when the stick S is moved forward and backward, to control the surfaces 81 and 83 simultaneously to assist the elevators 67 and 69. Thus the differential movements of the supplementary surfaces 81 and 83 (responsive to turning of wheel W) are automatically reversed in sense and equal movements (responsive to fore and aft movement of stick S) are made smaller in magnitude as the pylons descend toward and into the airplane attitude of Fig. 2.

When the craft is in airplane attitude (Figs. 1-3), it may be steered to the right by rotating the wheel W to the right. This rotates pulley 213 anti-clockwise, looking down. This through cable 187 controls the rudder in the proper direction for the desired right turn. At the same time, the forward end of the channel lever 221 moves anti-clockwise, looking down. Thus the ball end 222 of the lever 223 moves likewise, rotating the shaft 249 clockwise, looking forward. Thus the pulley 251 rotates clockwise and the cable 253 causes opposite rotations of the opposite pulleys 183. These in turn, through the cables 175, cause opposite movements of the supplementary surfaces 81 and 83 in the proper direction for the desired right bank which is required for the right turn. At the same time, the opposite levers 225, which control the opposite ailerons 63 and 65, are moved oppositely by the oppositely moving reaches of the rudder cable 187. It may be noted from Figs. 9 and 10 that these levers 225 are coupled into the rudder cable for the purpose. In Fig. 9 the levers are shown as being connected to opposite members 226, which effect the aileron control in the usual way.

Thus the supplementary surfaces 81 and 83 in an airplane attitude act like the ailerons 63 and 65, that is, they are differentially movable in response to turning of wheel W in coordination with the ailerons. Pitching moments are obtained in the usual way by moving the stick S back and forth, and the resulting effect is both upon the elevators 67 and 69, and the surfaces 81 and 83 which all move together. However, surfaces 81 and 83, in coordinating with the elevators in airplane attitude, have less sensitivity than these surfaces have when operating together in helicopter attitude.

For pitching movements, the stick is pushed forward or backward as usual, which involves the described control of the elevators 67 and 69. Under such conditions the wheel W is not turned and consequently the rudder 71 is not turned, nor are the ailerons 63 and 65 given any movements. The movements of the surfaces 81 and 83 are, as indicated, only slight. Thus the function of the supplementary surfaces in airplane attitude in straight flight is slightly to assist the conventional control surfaces which provides greater controllability of the craft. However, they act only as parallel operating supplements. Thus when the wheel is pushed forward the supplementary surfaces assist the elevators in lowering the nose; and when the wheel is pulled backward these surfaces assist in raising the nose. The sensitivity of the supplementary surfaces when acting as elevator aids is a function of the pylon orientation, the sensitivity decreasing as the pylons go down to horizontal position, being a minimum in the airplane attitude of Fig. 2.

The apparatus may be built in relatively compact form. Thus, for example, the parts shown within the dot-dash lines of Fig. 15 may be rigged in a suitable compact gear box such as shown at B in Figs. 9 and 10.

The following points are recapitulated for best understanding of the invention:

Both operations of lowering the pylons 73 and forward motion of the upper end of the stick S result in forward movement of ball 222 in the slot 221. Thus, when the pylons are down this ball 222 is well forward of the axis of shaft 211. When the pylons are up and stick S in neutral this ball is at the axis of shaft 211; but if the stick S be tilted back by pulling back the wheel W, the ball 222 will be behind the axis of shaft 211. For a given rotation of the wheel W, when the pylons are up and the stick back, the supplementary surfaces 81 and 83 rotate differentially in one sense (see Fig. 6 for a right-hand turn as a helicopter) and when the pylons are down, the same rotation of the wheel W (for a right-hand turn as an airplane) will cause said supplementary surfaces 81 and 83 to rotate differentially in the opposite sense so as to coordinate with the differential movements of the ailerons 63 and 65. This reversal of sense occurs when the ball 222 passes across the center line of the shaft 211. Crossing occurs when the pylons have progressed through a small angle down from their vertical positions and the stick has been moved forward almost to neutral. For example, in Fig. 6, which shows a helicopter attitude, a right-hand turn of the wheel has caused the near surface 81 to move anti-clockwise; whereas in the Fig. 8 transitional attitude, a right-hand turn of the wheel has caused the near surface 81 to rotate clockwise. For further pylon adjustments down to airplane attitude the sense of movements of surfaces 81 and 83 is as in Fig. 8.

It will be observed, in addition, that the fore-and-aft movements of the stick S also adjust the ball 222 in the groove 221. Since, however, forward motion of the stick S always causes the ball 222 to move forward in the groove 221, and backward movement of the stick S causes the ball 222 to move backward, the change in sensitivity of control is in one direction or another, depending upon which side of the axis of shaft 211 the ball 222 is on. Thus when the pylons are down, forward motion of the stick S (when ball 222 is already in the forepart of groove 221) will increase the sensitivity of response of the surfaces 81 and 83 to turning of the wheel W. On the other hand, when the pylons are up (ball 222 in the rear end of groove 221), any forward motion of the stick S will drive ball 222 closer to the center of shaft 211, and thus decrease the sensitivity of the differential motions of the surfaces 81 and 83 in response to turning of the wheel W.

At some transitional point of the pylons the ball 222 is on the center line of shaft 211 and turning of the wheel has no effect on the differential movements of the surfaces 81 and 83; but it should be noted that under such a condition the craft has a substantial forward velocity which makes the controlled rudder 71 and ailerons 63 and 65 effective for a banked turn in response to turning of the wheel W.

It should also be noted that when the slot in lever 283 is parallel to the circular rack 289, any action of the pylons through cable 307 and shaft 311 moves the ball 285 back and forth in 283 without relative rotation of the lever 287. On the other hand, in other adjustments of stick S the groove in 283 may not be parallel to the center line of 289, and under such conditions pylon movement will introduce an incidental angling of the lever 287 but any effect introduced thereby is naturally corrected by the pilot by proper manipulation of the stick S and wheel W to obtain the desired movements of the craft.

Advantages of the invention are that in one aircraft are attained the advantages of helicopter and airplane operation, without their respective disadvantages. The craft, exclusive of engine and ordinary trimming controls, requires only two basic control motions for full control. These are the same whether the craft is operating as a helicopter or as an airplane. These control motions are simply the rotation of the wheel W and the fore-and-aft motion of the stick S. Thus regardless of the mode of flight in which the craft is operating, the operator always performs his control actions in the same sense when a given maneuver is called for. Thus, for example, when it is desired to turn to the right and at the same time raise the nose, the wheel is rotated to the right and pulled back, either when the craft is operating as a helicopter, an airplane, or in transitional flight. Furthermore, the various control surfaces are arranged and interconnected for complete control and excellent stability throughout all conditions of flight.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. An aircraft for airplane and helicopter attitudes of flight comprising a frame, wings having oppositely movable ailerons for bank and turn movements, stabilizers having equally movable elevators for pitching movements, pylon means pivoted to the frame and movable from an airplane attitude to a helicopter attitude, air screw means on the pylon means, power means in the frame adapted to drive said air screw means irrespective of the position of the pylon means, supplementary surfaces on the pylon means and located in the air wash from said air screw means, a control for the supplementary surfaces, ailerons and elevators having both fore-and-aft and lateral control movements, the supplementary surfaces responding to lateral movements of the control when the pylon means is in an airplane attitude to coordinate with the oppositely movable ailerons for banking and responding to fore-and-aft movements of the control to function together to supplement action of the elevators, and means responsive to lifting movement of the pylon means whereby when the pylon means is in a helicopter attitude in response to the same lateral movements of the control means the angular aspects of the supplementary surfaces are reversed with respect to the air wash and whereby in response to the same fore-and-aft movements of the control the supplementary surfaces function together.

2. In an aircraft for airplane and helicopter attitudes of flight comprising a frame, wings on the frame having oppositely movable ailerons, stabilizers on the frame having equally movable elevators, a rudder on the frame coordinated with the ailerons for bank and turn movements, pylon means pivoted to the frame and movable from an airplane attitude to a helicopter attitude, air screw means on the pylon means, an engine in the frame, a drive between the engine and the air screw means for driving the air screw means irrespective of the position of the pylon means, supplementary surfaces on the pylon means and located in the air wash of said air screw means, a coordinating control for the supplementary surfaces, ailerons, elevators and rudder having fore-and-aft and lateral control movements, the supplementary surfaces oppositely responding to lateral movements of the control when the pylon means is in an airplane attitude to coordinate with the oppositely movable ailerons for banking and responding to fore-and-aft movements of the control to function together to supplement action of the elevators, and means responsive to lifting movement of the pylon means whereby when the pylon means is in a helicopter attitude in response to the same lateral movement of the control means the angular aspects of the supplementary surfaces are reversed with respect to the air wash and whereby in response to the same fore-and-aft movements of the control the supplementary surfaces function together but with a greater sensitivity of response.

3. In an aircraft for airplane and helicopter attitudes of flight comprising a frame, wings on the frame having oppositely movable ailerons, stabilizers on the frame having equally movable elevators, a rudder on the frame coordinated with the ailerons for bank and turn movements, a pair of pylons pivoted to the frame and movable together from a substantially horizontal airplane attitude to a substantially vertical helicopter attitude, air screws on the respective pylons, an engine in the frame, a branched drive from the engine to the respective air screws and adapted to drive said screws irrespective of the position of the pylons and to phase the motions of the screws, supplementary surfaces respectively on the pylon means and located in the air wash of said air screw means, a coordinating control for the supplementary surfaces, ailerons, elevators and rudder having fore-and-aft and lateral control movements, the supplementary surfaces oppositely responding to lateral movements of the control when the pylon means is substantially horizontal to coordinate with the oppositely movable ailerons for banking and responding to fore-and-aft movements of the control to function together to supplement action of the elevators, and means responsive to lifting movements of the pylons whereby when the pylons are substantially vertical in response to the same lateral movement of the control the aspects of the supplementary surfaces are reversed with respect to the air wash and whereby in response to the same fore-and-aft movements of the control the supplementary surfaces function together but with a greater sensitivity of response.

4. An aircraft comprising a frame, a pivoted pylon on the frame movable from a substantially horizontal position for airplane attitude to a substantially vertical position for helicopter attitude, an air screw on the pylon, an engine in the frame for driving the air screw irrespective of the pylon position, wings on the frame having ailerons, stabilizers on the frame having elevators, and a rudder on the frame, supplementary control surfaces on the pylon, control means in the frame coupled with said ailerons, elevators, rudder and supplementary surfaces and arranged to move said supplementary control surfaces together and coordinately with the elevators so that pitching of the aircraft is brought about by longitudinal control movements when the pylon is up or down and to move said supplementary surfaces differentially relative to one another when the pylon is up or down but coordinately with the ailerons when the pylon is down, so that turning movements are brought about by lateral movements of the control means when the pylon is up or down.

5. An aircraft comprising a frame, a pivoted pylon on the frame movable from a substantially horizontal position for airplane attitude to a substantially vertical position for helicopter attitude, an air screw on the pylon, an engine in the frame for driving the air screw irrespective of the pylon position, wings on the frame having ailerons, stabilizers on the frame having elevators, and a rudder on the frame, supplementary control surfaces on the pylon, control means in the frame coupled with said ailerons, elevators, rudder and supplementary surfaces and arranged to move said supplementary control surfaces together and coordinately with the elevators so that pitching of the aircraft is brought about by longitudinal control movements when the pylon is up or down and to move said supplementary surfaces differentially relative to one another when the pylon is up or down but coordinately with the ailerons when the pylon is down, so that turning movements are brought about by lateral movements of the control means when the pylon is up or down, the same lateral movements of the control means in the two attitudes resulting in opposite differential movements of said supplementary control surfaces.

6. An aircraft comprising a frame, a pivoted pylon on the frame movable from a substantially horizontal position for airplane attitude to a substantially vertical position for helicopter attitude, an air screw on the pylon, an engine in the frame for driving the air screw irrespective of the pylon position, wings on the frame having ailerons, stabilizers on the frame having elevators, and a rudder on the frame, supplementary control surfaces on the pylon, control means in the frame coupled with said ailerons, elevators, rudder and supplementary surfaces and arranged to move said supplementary control surfaces together and coordinately with the elevators so that pitching of the aircraft is brought about by longitudinal control movements when the pylon is up or down and to move said supplementary surfaces differentially relative to one another when the pylon is up or down but coordinately with the ailerons when the pylon is down, so that turning movements are brought about by lateral movements of the control means when the pylon is up or down, the same lateral movements of the control means in the two attitudes resulting in opposite differential movements of said supplementary control surfaces, and the same longitudinal control movements of the control means in the two attitudes resulting in different sensitivities of said supplementary control movements which coordinate with the elevators.

7. An airplane comprising a longitudinal frame having wings adapting it for forward flight, pylons pivoted at their rear ends to said frame and movable from a substantially horizontal position to a substantially upright position, air screws on said pylons, an engine for operating said air screws regardless of the positions of the pylons, separate supplementary air surfaces on the respective pylons, control means for said surfaces for moving them to angled positions whereby they are effective to roll the ship on a substantially horizontal axis when the pylons are down and to turn the ship on a substantially vertical axis when the pylons are up, and means operative by pylon movement whereby the effect of the control means for said supplementary surfaces becomes angularly reversed as the pylons are moved to their upright positions.

8. An airplane comprising a frame provided with wing surfaces for forward airplane flight, pylon means pivoted to said frame and movable from a substantially horizontal position to a substantially vertical position, air screw means on the end of said pylon means, an engine in the frame for driving said air screw means regardless of the position of the pylon means, supplementary air surfaces on said pylon means, and operating means automatically moving said supplementary air surfaces from a position substantially parallel to the pylon means when down to a position at a substantial angle to the pylon means when the pylon means is up.

9. An airplane comprising a frame provided with wing surfaces for forward airplane flight, pylon means pivoted to said frame and movable from substantially horizontal position to a substantially vertical position, air screw means on the end of said pylon means, an engine in the frame for driving said air screw means regardless of the position of the pylon means, supplementary air surfaces on said pylon means, operating means automatically moving said supplementary air surfaces from a position substantially parallel to the pylon means when down to a position at a substantial angle to the pylon means when up, control means for relatively angling the supplementary surfaces, and means responsive to positioning of the pylon means causing reversal of the relative angling of the supplementary surfaces responsive to a given movement of said control means.

10. An airplane comprising a frame provided with wing surfaces for forward airplane flight, pylon means pivoted to said frame and movable from a fore-and-aft substantially horizontal position to a substantially vertical position, air screw means on the end of said pylon means, an engine in the frame for driving said air screw means regardless of the position of the pylon means, and supplementary air surfaces on said pylon means, and operating means automatically moving said supplementary air surfaces from a position substantially parallel to the pylon means when down to a position at a substantial angle to the pylon means when the pylon means is up, said last-named angle being other than 90°.

11. An airplane comprising a frame, pylon means pivoted to the frame and movable from a substantially horizontal position to a substantially vertical position, a vertically movable slide, a connecting rod linking said slide and the pylon means, substantially horizontally movable power means, a flexible connector including a tackle between said power means and the slide whereby the movement of the slide is a made fraction of the movement of said power means.

12. An aircraft for airplane and helicopter flight comprising a frame having control surfaces for airplane attitudes of flight, a pylon pivoted to the frame and movable from a longitudinal airplane attitude to an upright helicopter attitude, an air screw at the end of the pylon the thrust of which is changed with change in attitude of the pylon, an engine in the frame adapted to operate said air screw irrespective of pylon position, supplementary control surfaces on the pylon movable bodily therewith as the pylon pivots, a control in the frame adapted to operate said surfaces and said supplementary surfaces on the pylon, said control having longitudinal and lateral control movements and being so connected with said surfaces that longitudinal and lateral control movements of the control during airplane attitude of flight coordinate all control surfaces for pitching and turning movements respectively of the aircraft, and including means responsive to upright positioning of the pylon whereby substantially said same longitudinal and lateral control movements of the control operate upon said supplementary control surfaces respectively to effect pitching and turning movements in the helicopter attitude of flight.

JOHN C. QUADY.
WILLIAM L. DAVIS, Jr.

REFERENCES CITED

The following references are of record in the file of this patent:

UNITED STATES PATENTS

| Number | Name | Date |
| --- | --- | --- |
| 1,353,501 | Vogelzang | Sept. 21, 1920 |
| 1,443,572 | Gosline | Jan. 30, 1923 |
| 1,808,908 | Steinmann | June 9, 1931 |
| 1,903,345 | Steinmann | Apr. 4, 1933 |
| 1,951,817 | Blount | Mar. 20, 1934 |